United States Patent [19]

Luckhurst

[11] Patent Number: 5,291,307
[45] Date of Patent: Mar. 1, 1994

[54] CONTROL CIRCUIT FOR AN IMAGE USED IN A DOCUMENT PROCESSING MACHINE

[75] Inventor: Graham Luckhurst, Kitchener, Canada

[73] Assignee: NCR Corporation, Dayton, Ohio

[21] Appl. No.: 741,275

[22] Filed: Aug. 7, 1991

[51] Int. Cl.$^5$ .................. H04N 1/40; G08K 7/14
[52] U.S. Cl. .................. 358/446; 358/474; 382/16
[58] Field of Search ......... 358/446, 474, 482, 483, 358/174, 166, 406, 479, 213.11, 213.18; 382/7, 16; H04N 1/40

[56] References Cited

U.S. PATENT DOCUMENTS

| | | | |
|---|---|---|---|
| 4,143,356 | 3/1979 | Nally | 340/146.3 |
| 4,201,978 | 5/1980 | Nally | 340/146.3 |
| 4,264,808 | 4/1981 | Owens et al. | 235/379 |
| 4,525,741 | 6/1985 | Chahal et al. | 358/446 |
| 4,631,598 | 12/1986 | Burkhardt et al. | 358/483 |
| 4,675,744 | 6/1987 | Mason | 358/494 |
| 4,752,897 | 6/1988 | Zoeller et al. | 382/16 |
| 4,821,108 | 4/1989 | Barbagelata et al. | 358/474 |
| 4,888,812 | 12/1989 | Dinan et al. | 382/7 |
| 4,912,558 | 3/1990 | Easterly et al. | 358/446 |
| 4,916,552 | 4/1990 | Kallin et al. | 358/494 |
| 5,034,817 | 7/1992 | Everett, Jr. | 358/126 |
| 5,101,284 | 3/1992 | Tanabe | 358/461 |
| 5,164,726 | 11/1992 | Berstein et al. | 358/174 |

Primary Examiner—Edward L. Coles, Sr.
Assistant Examiner—Jill Jackson
Attorney, Agent, or Firm—Elmer Wargo

[57] ABSTRACT

A control circuit for processing image data received from an imager, like a CCD, with the circuit providing automatic compensation for those factors usually associated with imaging systems. The imager generates image data for a predetermined number of pixel positions in a scan line at a predetermined rate for a document being moved relative to the scan line. This image data is processed, amplified, and fed (at the predetermined rate) into a flash A/D converter used in the circuit. Offset and gain compensation data are supplied as reference levels to the converter at the predetermined rate to provide offset and gain compensation for each pixel position in the scan line. This ensures predictable post processing performance with regard to binarization, compression, and machine reading plus a consistent and undistorted gray level representation of the imaged document.

3 Claims, 7 Drawing Sheets

SIGNAL MAKEUP

FIG. 7

VIDEO SIGNAL INPUT TO VIDEO AMP 58

CONTROL CIRCUIT FOR AN IMAGE USED IN A DOCUMENT PROCESSING MACHINE

BACKGROUND OF THE INVENTION (1) Field of the Invention

This invention relates to a control circuit for processing image data received from an imager, with the circuit being useful in providing automatic compensation for those elements associated with the camera or imager.

(2) Background Information

When imaging systems are employed, there several factors which can affect a typical system. Some of these factors are:

1. CCD sensitivity when a Charge Coupled Device is used as the "camera".
2. Certain shortcomings of CCDs, such as dark signal clamp error, dark signal non-uniformity, and photo sensor non-uniformity.
3. Analog signal conditioning relative to drift and gain errors.
4 Lens cosine 4th roll off or non-uniform response of lenses used in the imaging system.
5. Light Emitting Diode (LED) illumination intensity, non-uniformity in illumination, and color balance if LEDs of different colors are used.
6. Thermal effects on the elements included in the imaging system.

It is important to maintain a consistent and stable imaging system to insure that the image data which results therefrom will ensure a predictable post processing performance with regard to binarization, compression, and machine reading.

SUMMARY OF THE INVENTION

A feature of the present invention is that it can accommodate for manufacturing and aging variations in the illumination, CCD response, and CCD offsets on a pixel by pixel basis in an imaging system.

Another feature of this invention is that it is simple to construct, and it is inexpensive to manufacture.

In a preferred embodiment of this invention, there is provided a circuit having a flash A/D converter therein, with one aspect of this invention relating to a method comprising the steps of:

(a) supplying a stream of pixel data at a predetermined pixel rate from an imager to said flash A/D converter; and (b) supplying offset and gain compensation data to said flash A/D converter at said predetermined pixel rate so as to provide offset and gain compensation for said stream of pixel data on a pixel by pixel basis.

In another aspect of this invention, there is provided a circuit comprising:

an imager for generating image data for a predetermined number of pixel positions in a scan line at a predetermined rate;

storing means for storing offset and gain compensation data for each pixel position in said scan line;

a flash A/D converter;

supply means for supplying said image data to said flash A/D converter at said predetermined rate; and transfer means for transferring said offset and gain compensation data to said flash A/D at said predetermined rate so as to provide said offset and gain compensation data for each said pixel position in said scan line to enable offset and gain compensation to be performed by said flash A/D converter for each pixel position in said scan line.

In yet another aspect of this invention there is provided in an imaging system which includes a scanning line, a white reference member positioned at said scanning line, illumination means for illuminating said white reference member or a document to be scanned at said scanning line, a charge coupled device and associated video amplifier for generating a scanning line of pixels from light reflected from said white reference member or a document at said scanning line, and a flash A/D converter, with this aspect of the invention relating to a method of providing gain correction to said flash A/D converter for each pixel in said scanning line of pixels, with said method comprising the steps of:

(a) obtaining a voltage profile for each of the pixels in said scanning line of pixels from light reflected from said white reference member;

(b) storing the voltage profile from step (a);

(c) setting offset and gain data for said flash A/D converter to correspond to said voltage profile from step (b);

(d) adjusting the gain of said flash A/D converter with said offset and gain data on a pixel by pixel basis for each pixel in said scanning line of pixels.

The above advantages and others will be more readily understood in connection with the following description, claims, and drawing.

DESCRIPTION OF THE PREFERRED EMBODIMENT

Figures 1, 10:
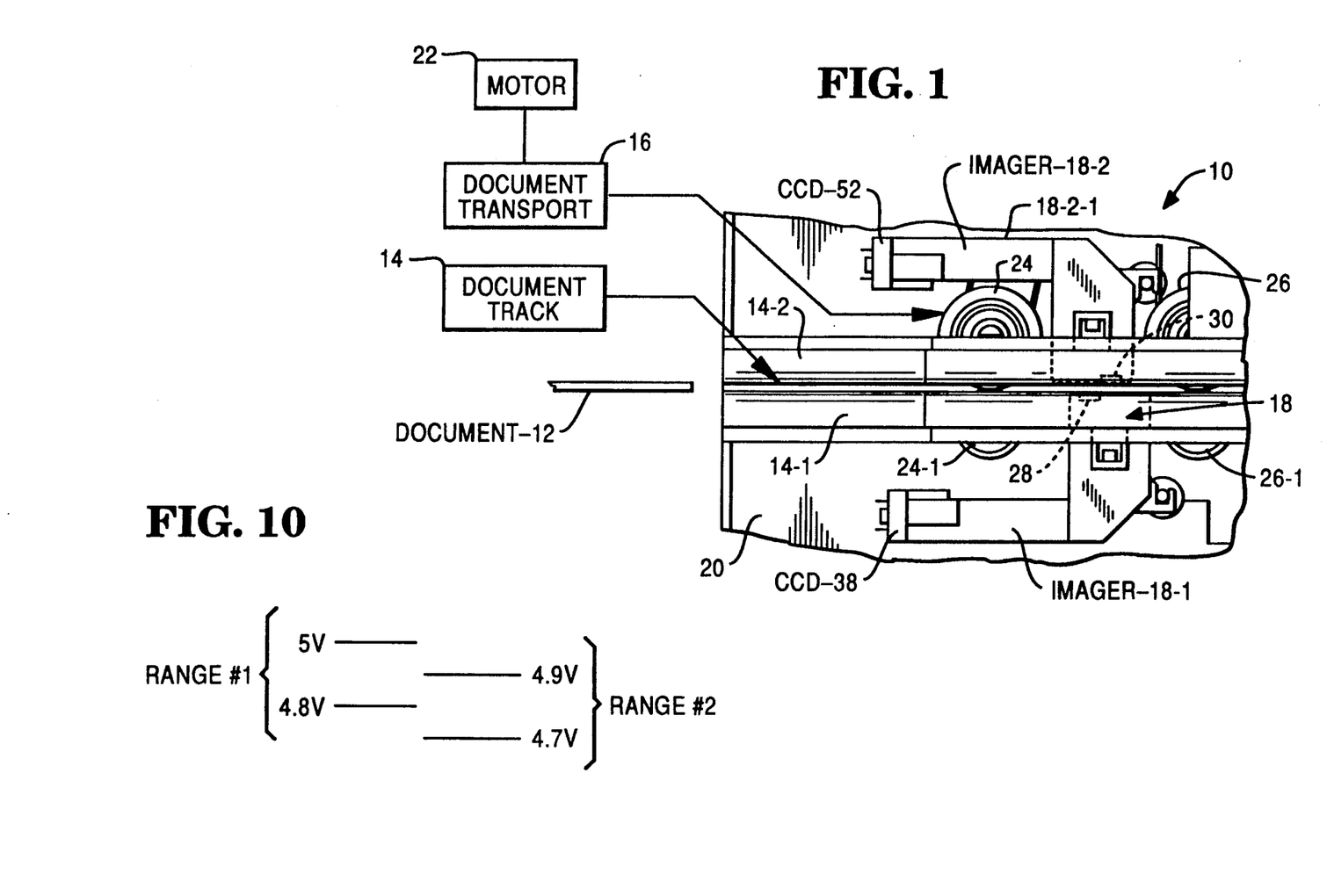
FIG. 1 is a schematic plan view of a portion of a document processing machine in which first and second imagers are positioned along a document track in the machine, with the first and second imagers supplying image data to a circuit included in this invention.
FIG. 10 (shown on the sheet containing FIG. 1) is a diagram showing certain values associated with a bi-level tracking offset shown in FIG. 3A.

FIG. 1 is a plan view, in schematic form, of a portion of a document processing machine 10 with which this invention may be used. In the embodiment described, the machine 10 is used to process documents, like checks and deposit slips, for example, although the techniques of this invention may be used to process other documents wherever imaging is performed. A document 12 is positioned in a document track 14, and when properly positioned therein, a document transport 16 is used to move the document 12 in imaging relationship with an imaging means 18 which is used for imaging data from the document 12. The imaging means 18 includes first and second imagers 18-1 and 18-2 which are positioned on opposed sides of the document track 14. The imager 18-1 is used to image the front of the document 12, and the imager 18-2 is used to image the rear of the document 12.

The document track 14 includes a first wall 14-1 and a second wall 14-2 which are spaced apart and upstanding from a frame 20 included in the machine 10, with the document 12 being fed between the first and second walls 14-1 and 14-2. The top of the document 12 is seen in FIG. 1, and the bottom long side of the document 12 glides along the bottom of the track 14. There are sensors (not shown) within the document track 14 to provide a control signal when the document is properly positioned therein. When so positioned, a control means, to be later described herein, is used to energize a motor 22 included in the document transport 16 to move the document 12 in imaging relationship with the imaging means 18.

The document transport 16 also includes several drive rollers 24 and 26 which are positioned along the document track 14 as shown in FIG. 1. The drive rollers 24 and 26 are operatively coupled to the motor 22 of the document transport 16 by suitable idler pulleys and a timing belt to move and position the document 12 relative to the first and second imagers 18-1 and 18-2. The drive rollers 24 and 26 have pinch rollers 24-1 and 26-1, respectively, positioned in opposed relationship therewith to move the document 12 therebetween. The motor 22 is a bi-directional stepper motor which is used to feed the document 12 in the document track 14 in a first feeding direction which is left to right as viewed in FIG. 1 and to feed the document in a second feeding direction which is from right to left as discussed.

In the embodiment described, the first and second imagers 18-1 and 18-2 (FIG. 2) are identical, and consequently, only a description of the first imager 18-1 will be given. Notice that the first imager 18-1 is placed slightly downstream from the second imager 18-2. This is done so that a white reference member 28 located in the first imager 18-1 is positioned therein to be used by the second imager 18-2, and correspondingly, a white reference member 30 located in the second imager 18-2 is positioned therein to be used by the first imager 18-1. Each of the imagers 18-1 and 18-2 has a circuit 32 associated therewith for performing calibration of the associated imagers and for performing other functions to be later described herein.

Figure 2:
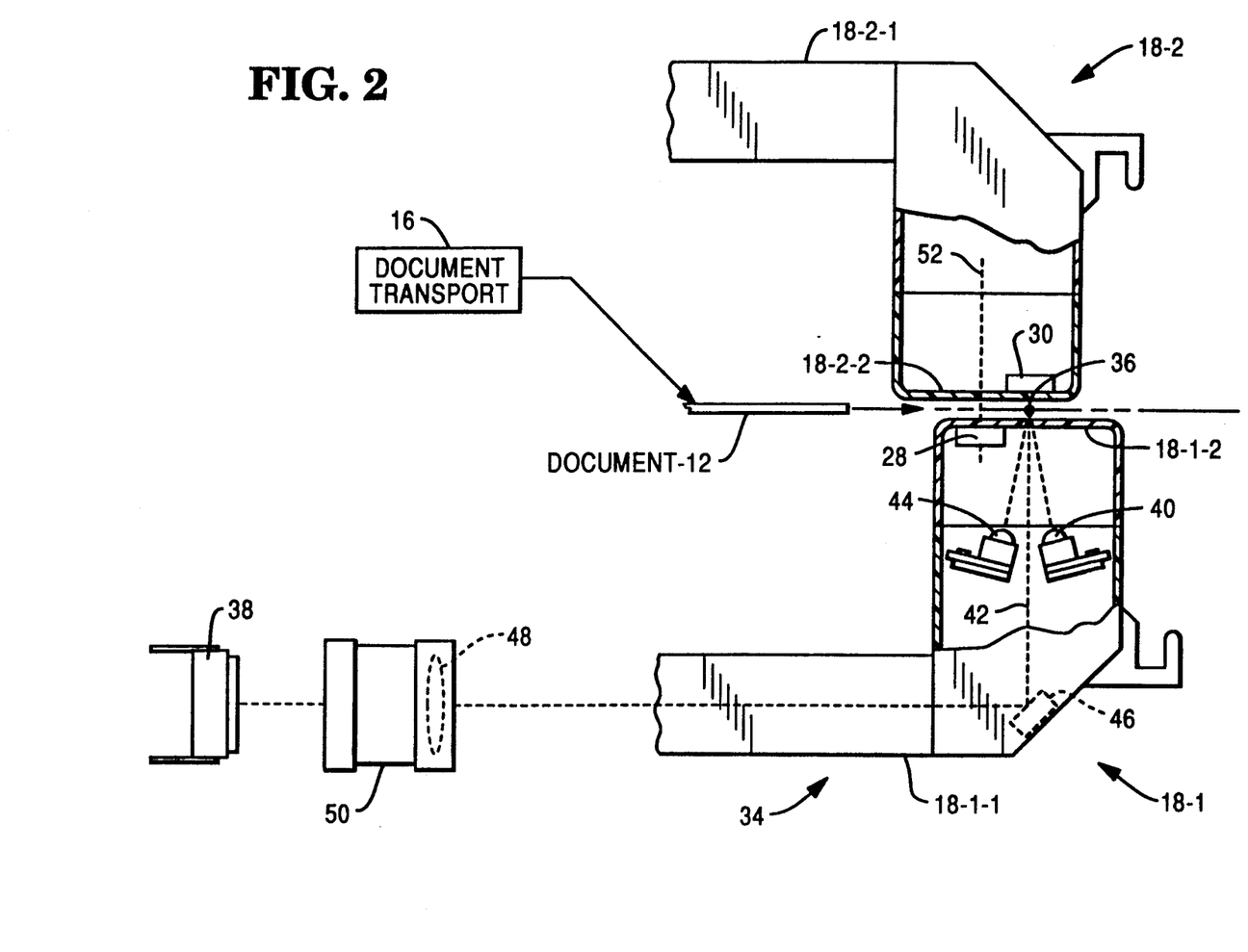
FIG. 2 is a schematic diagram showing an optical system used in the imagers shown in FIG. 1.

The imager 18-1 has an optical system 34, shown schematically in FIG. 2, with the optical system 34 being used to direct light at a scanning line 36 (shown as a dot in FIG. 2) and to have the image data or pixels derived from the scanning line 36 directed to a CCD 38. In the embodiment described, there is a line 40 of green Light Emitting Diodes (LEDs) positioned at an angle to the optical path 42 to direct light at the scanning line 36, and there is also a line 44 of red LEDs also positioned at an angle to the optical path 42 to direct light at the scanning line 36. As shown in FIG. 2, the top long side of the document 12 is visible, and the scanning line 36 is perpendicular to the plane of FIG. 2. The lines 40 and 44 of LEDs extend into the plane of FIG. 2, with there being a sufficient number of LEDs to illuminate the height of the document 12 at the scanning line 36.

Continuing with a description of the scanning system 34 (FIG. 2), the light reflected from the document 12 consists of a plurality of pixels or picture elements which are reflected off a mirror 46 which is positioned at an angle of 45 degrees as shown, to direct this reflected light through a lens 48 to the associated CCD 38. The lens 48 is mounted in a lens barrel 50 to be adjusted axially therein so as to maximize the strength and focus the light from the scanning line 36 falling on the CCD 38. The mirror 46 has the associated silver layer deposited on the front side thereof so as to eliminate secondary reflections when compared to a design which has the associated silver layer located on the rear of the mirror 46. The imager 18-1 has a housing 18-1-1 which is sufficiently light proof to exclude extraneous light, while the front portion 18-1-2 of this housing is transparent to enable light from the lines 40 and 44 of LEDs to illuminate the scanning line 36 and to permit light reflected therefrom to pass through the front portion 18-1-2.

The imager 18-2 is identical to the imager 18-1 just described; however, the imager 18-2 has its own CCD 52 (FIG. 1) and circuit 32. Notice that the optical axis 42 of the first imager 18-1 is located slightly downstream (when feeding from left to right in FIG. 2) when compared to the optical axis 52 of the second imager 18-2. Notice also that the white reference member 30 of the second imager 18-2 is positioned along the optical axis 42 of the first imager 18-1. Correspondingly, the white reference member 28 of the first imager 18-1 is positioned along the optical axis 52 of the second imager 18-2. Each of the white reference members 28 and 30 is a strip of white material which is secured to the inside of the transparent portions 18-1-2 and 18-2-2 of their respective housings 18-1-1 and 18-2-1 so as to extend along the length of the scanning line 36. The white reference members 28 and 30 are used during a calibration process which is completed prior to having a document 12 move in the document track 14. The calibration process mentioned represents one of the functions performed by the circuit 32. These aspects will become clearer during a description of the circuit 32.

Figure 3A:
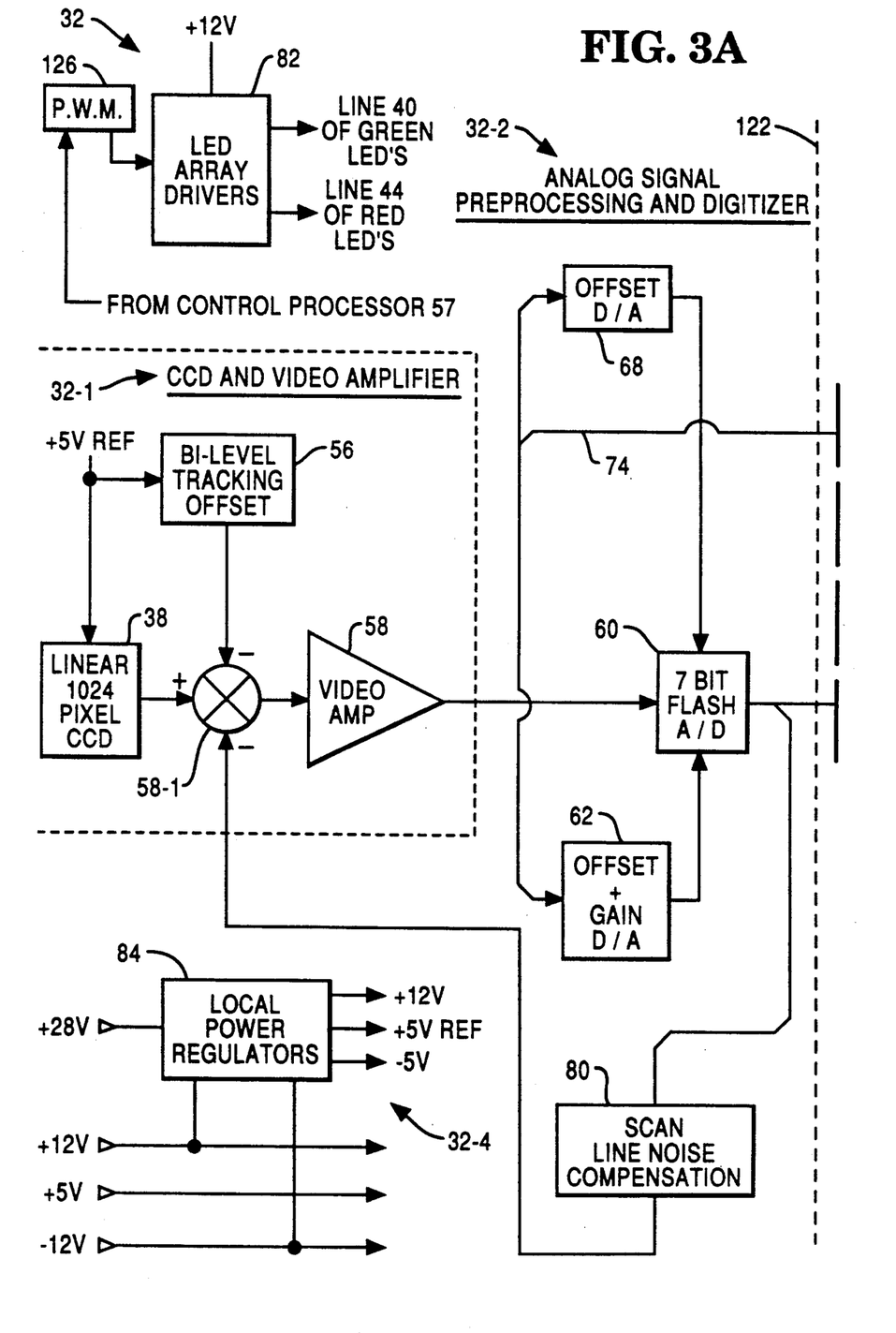
FIGS. 3A and 3B, taken together, show a circuit used with this invention.
Figure 3B:
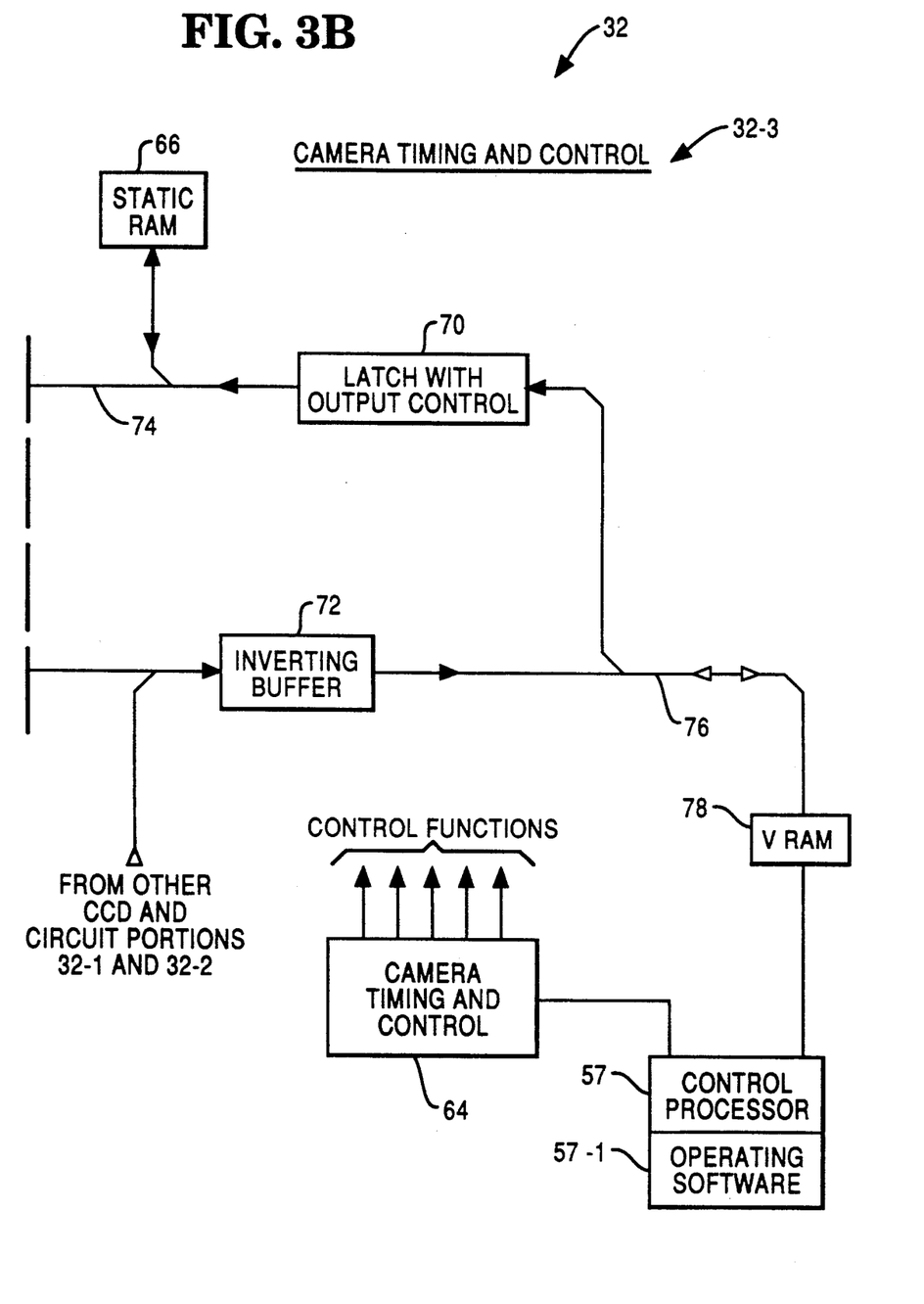

The control circuit 32 is shown in schematic block form in FIGS. 3A and 3B. The control circuit 32 is divided into four main portions 32-1, 32-2, 32-3, and 32-4. The major portions of the circuit 32 can be described as follows:

Portion 32-1 relates to a CCD and video amplifier;

Portion 32-2 relates to analog signal processing and a digitizer;

Portion 32-3 relates to camera timing and control; and

Portion 32-4 relates to power regulators.

Some general comments about each of the major portions of the circuit 32 will be given, and these comments will be followed by a general description of the operation of the circuit 32.

With regard to portion 32-1 of circuit 32, the following general comments apply. The CCD sensitivity, integration times, and illumination strength at the scanning line 36 result in a low image data signal level coming out of the CCDs 38 and 52 associated with each of the imagers 18-1 and 18-2. There is one circuit portion 32-1 and one circuit portion 32-2 provided for each of the imagers 18-1 and 18-2; therefore, a discussion of these circuit portions as they apply to the imager 18-1 will be given. In the embodiment described, the signal level coming out of the CCD 38 is 75 mV nominal peak, with a variation of +/−25 mV for a white document 12 positioned at the scanning line 36. The CCD 38 can also have large variations in the associated dark level signal clamp error which result in a fixed output offset of up to 200 mV. Therefore, the design of the "front end" electronics must insure minimal introduction of thermal noise and drift and must also be able to eliminate the dark signal clamp error. The +5 VREF signal shown in FIG. 3A is a DC level that the CCD 38 uses to reference the output video signal therefrom. The circuit portion 32-1 includes a bi-level tracking offset 56 which performs a level shifting operation and ensures that any drift in the 5 VREF signal is not reflected at the output of a video amplifier 58 also included in this circuit portion. The bi-level tracking offset 56 includes two ranges which are controlled by a control processor 57; these two ranges compensate for dark signal clamp errors in the range of 0–108 mV and the range of 92–200 mV to ensure that the output from the video amplifier 58 stays within the −2 V to +2 V of the operating range of a flash A/D 60. The flash A/D 60 is a very high performance analog to digital converter, typically having an operating bandwidth in excess of 10 MHz. The remaining 100 mV of clamp error out of the CCD 38 are accommodated by the circuit portion 32-2. The overlap of the two ranges mentioned ensures that one range can be selected, since the actual dark level out of the CCD 38 is the clamp error plus a random dark signal nonuniformity of 15 mV for each pixel. The video amplifier 58 has a fixed gain suitable to ensure that the video dark signal to full white signal (with the appropriate offset subtracted from the CCD output) is within the input differential range of 2 V for the flash A/D 60. The summing node associated with the video amplifier 58 is shown as node 58-1 in FIG. 3A.

With regard to portion 32-2 of circuit 32, the following general comments apply. This circuit portion 32-2 accommodates video signal strength variations caused by the sensitivity of the CCD 38, nonuniformity in sensitivity of the CCD 38, lens cos4th roll off, LED illumination intensity, LED illumination profile nonuniformity, window transparency, mirror reflectance, and minor contamination of optical components. The accumulated signal strength variations have been designed to ensure the dark signal to peak white level from the CCD 38 lies within the range of 50–100 mV. The mentioned variations are primarily accommodated by dynamic control of the voltage applied to the high and low ends of a resistor network associated with the flash A/D 60. In the embodiment described, the analog output from the CCD 38 is inverted and clamped to the +5 VREF. Thus the dark signal levels are in the range of +5 V to +4.8 V and a full white signal level is in the range of +4.95 V to +4.7 V.

The CCD 38 provides 10 dark pixels at the beginning of each scan, and 8 of these pixels are summed and divided by eight (right shift by three) to generate an average dark pixel value. This average dark pixel value is converted to an analog signal using a simple resistor network to form a D/A converter, and the analog signal is subtracted from the CCD 38 signal at the summing node 58-1 of the video amplifier 58. This operation has the effect of reducing the scan line noise to an acceptable level which is ⅛th of the uncompensated signal.

With regard to portion 32-3 (FIG. 3B) of circuit 32, the following general comments apply. The CCD 38 incorporates a serial shift register which is used to sequentially shift out individual pixel voltage levels that have been determined by the reflected light falling on the individual photo diodes associated with the CCD 38 during the integration time. The portion 32-3 includes a camera timing and control circuit 64 which generally follows the sequential flow of data from the CCD 38. A static RAM 66 is used to store all and offset/gain data and offset data for the offset and gain D/A 62 and the offset D/A 68, respectively. Data flow out of the static RAM 66 is such that alternate values of offset and offset and gain data are sequentially loaded into the offset D/A 68 and the offset and gain D/A 62 for each pixel. A latch 70 and an inverting buffer 72 insure proper isolation between the flash A/D 60, the data bus 74 leading to the named D/As 62 and 68, and a data bus 76 leading to a video or VRAM 78.

Sequencing and timing control is generated by conventional digital components which are synchronized to a 12 MHz clock in the embodiment described. This timing and control circuitry 64 determines the CCD clock generation and integration time, flash A/D 60 sampling, data flow into and out of the static RAM 66, loading of data into the D/As 68 and 62, noise compensation timing for the scan line noise compensation circuit 80, and LED pulse width modulation associated with the LED array drivers 82. There is one camera timing and control circuit 64 for both the front imager 18-1 and the rear imager 18-2, and control of data flow from these imagers is controlled by the control processor 57 controlling the flash A/D 60 in each circuit 32 for the named imagers.

With regard to portion 32-4 (FIG. 3A) of circuit 32, the following general comments apply. This portion 32-4 includes conventional power regulators shown as block 84 for supplying the required voltage levels to the circuit 32.

Figure 4:
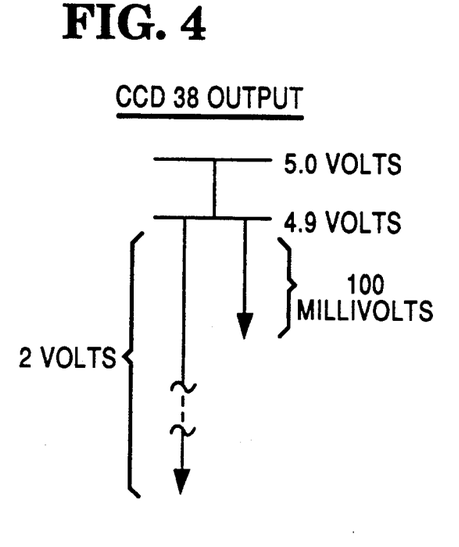
FIG. 4 is a schematic diagram showing certain offsets associated with the CCD shown in FIG. 3A.
Figure 5:
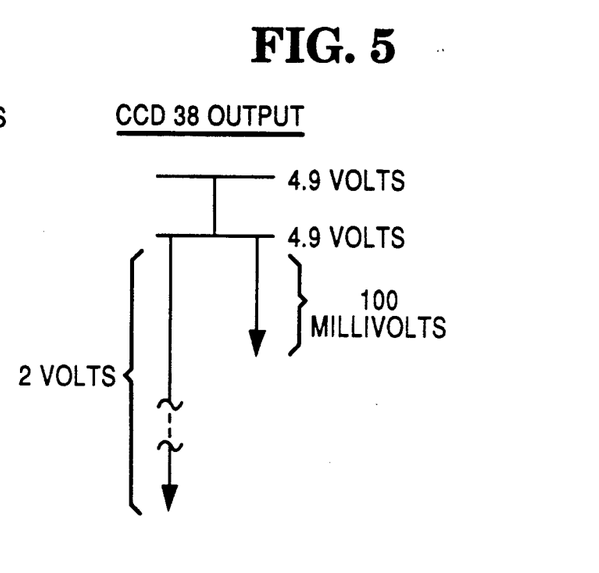
FIG. 5 is a schematic diagram showing certain offsets associated with the CCD shown in FIG. 3A.

It now appears appropriate to discuss the details of the circuit 32 shown in FIG. 3A and 3B. In this regard, FIGS. 4 and 5 show certain output ranges associated with the CCD 38 shown in FIG. 3A. The particular CCD selected for use in the circuit 32 is part number TCD132D which is manufactured by Toshiba, for example. The CCD 38 mentioned operates in the range of 5.0 volts down to 2.0 volts. A black or dark signal coming out of the CCD 38 when no light is present is typically between 5.0 volts and 4.8 volts; this value is typically referred to as the dark signal clamp error. The white signal or the illuminated signal typically is a negative going signal (for increasing whiteness) of about 100 millivolts maximum from the offset value mentioned. Due to the particular set up included in the circuit 32, the signal strength of the illuminated signal is about 100 millivolts as seen in FIGS. 4 and 5. Notice that the offset 5.0 volts to 4.8 volts (200 millivolts) is very large compared to the maximum signal strength of 100 millivolts. Before the signal strength of up to 100 millivolts can be processed accurately, the very large offset value must be eliminated.

A first offset (5.0 volts to 4.9) volts is shown in FIG. 4, and a second offset of 4.9 volts to 4.8 volts is shown in FIG. 5. The bi-level tracking offset 56, shown in FIG. 3A, is given this name because it gets rid of the range of offsets discussed in this paragraph. The bi-level tracking offset 56 is used to prevent the sensitive video amplifier 58 from saturating.

Figure 6:
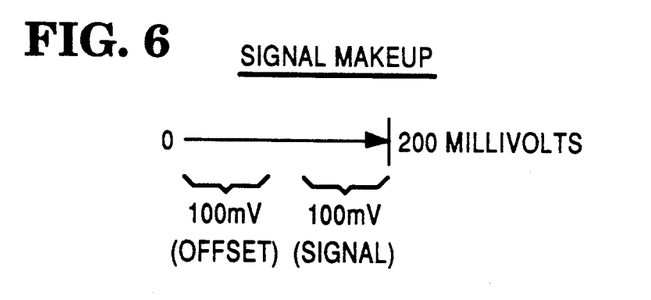
FIG. 6 is a schematic diagram showing the make-up of a signal.

In the embodiment described, it is desired to have a signal entering the video amplifier 58 (FIG. 3A) which is made up of no more than 100 millivolts of offset and up to 100 millivolts of signal as shown in FIG. 6. Up to 100 millivolts of dark offset is retained so as to be able to handle some drift and non-uniformity conditions which may be associated with the CCD 38, for example, and which the A/D 60 has greater flexibility and accuracy to remove. The combined maximum 200 millivolt signal requires a sensitive video amplifier 58 to be utilized, with the gain of this amplifier being 20.

The output of the video amplifier 58 is fed into the 7 bit flash A/D 60. In the embodiment described, the flash A/D 60 is chip #MC10321 which is manufactured by Motorola, for example. Essentially, the flash A/D 60 includes a voltage divider network with a plurality of resistors in the network and an equivalent number of comparators therein. There is also some digital logic within the flash A/D 60 which looks at the outputs from the internal comparators and provides a digital output from an analog input. An important feature of the flash A/D 60 is that it does the A/D conversion at a very fast rate and with respect to a variable negative and positive analog threshold.

The references for the flash A/D 60 are obtained from the offset D/A 68 and the offset and gain D/A 62 shown in FIG. 3A. An important feature of the circuit 32 is that the referencing for the flash A/D 60 is done at the same rate as new pixel data or pixels are coming from the video amplifier 58. The bandwidth of the flash A/D 60 analog input is 10 megahertz which is also the bandwidth of the reference inputs (from D/A 62 and 68) going to the flash A/D 60. This means that the circuit 32 is able to do adjustments with respect to gain and offset on a pixel by pixel basis. In the embodiment described, the analog input to the flash A/D 60 ranges from +2 volts L to −2 volts. The analog output of the offset D/A 68 ranges from +2 volts to −1 volt which represents a range of three volts absolute. The analog output of the offset and gain D/A 62 ranges from +1 volt to −2 volts for a range of 3 volts absolute. The analog output of the video amplifier 58 ranges from +2 volts to −2 volts.

Figure 7:
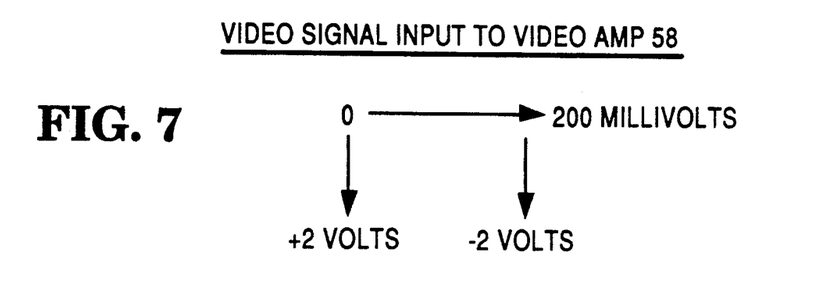
FIG. 7 is a schematic diagram showing certain outputs associated with the video amplifier shown in FIG. 3A.

The effective analog input to the video amplifier 58 (after offset compensation by the bi-level tracking offset circuit 56) has a working range of 0 to 200 millivolts. When the working voltage is at 0 millivolts, the output of the video amplifier 58 is +2 volts as shown in FIG. 7, and when the working voltage is at 200 millivolts, the output therefrom is −2 volts.

Figure 8:
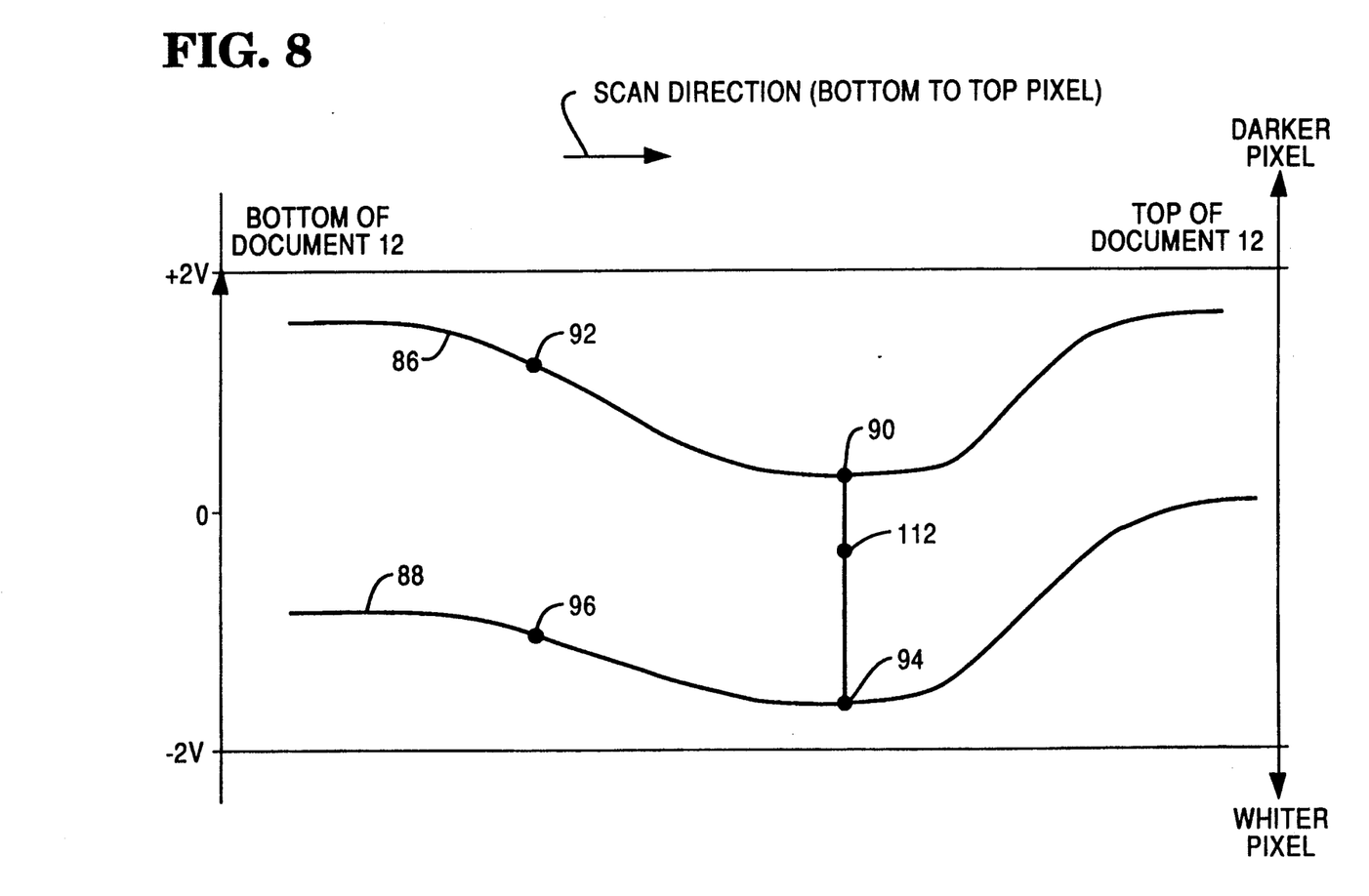
FIG. 8 is a schematic diagram showing a stream of pixel data lying within certain bounds.

FIG. 8 is a schematic diagram which is used to illustrate certain features of the circuit 32. In this regard, the scan direction is shown, with the scanning proceeding from the bottom of the document 12 to the top thereof. The range of gray scale values of pixels coming from the scanning line 36 proceeds upwardly (as viewed in FIG. 8) for a darker pixel, and downwardly for a lighter pixel. The line 86 represents the darkest output for the various photodiodes in the CCD 38, while the line 88 represents the lightest output coming from the various photodiodes in the CCD 38. Notice that the lines 86 and 88 are within the range of +2 volts to −2 volts discussed earlier herein. A photodiode which is near the center of the CCD 38 might have an output as indicated at point 90 which is more "leaky" than one nearer an extremity of the CCD 38, with the less leaky output being indicated at point 92. A white output coming from the photodiode associated with point 90 would probably be located at point 94 compared to a white output being located at point 96 and coming from the photodiode associated with point 92.

Figure 9:
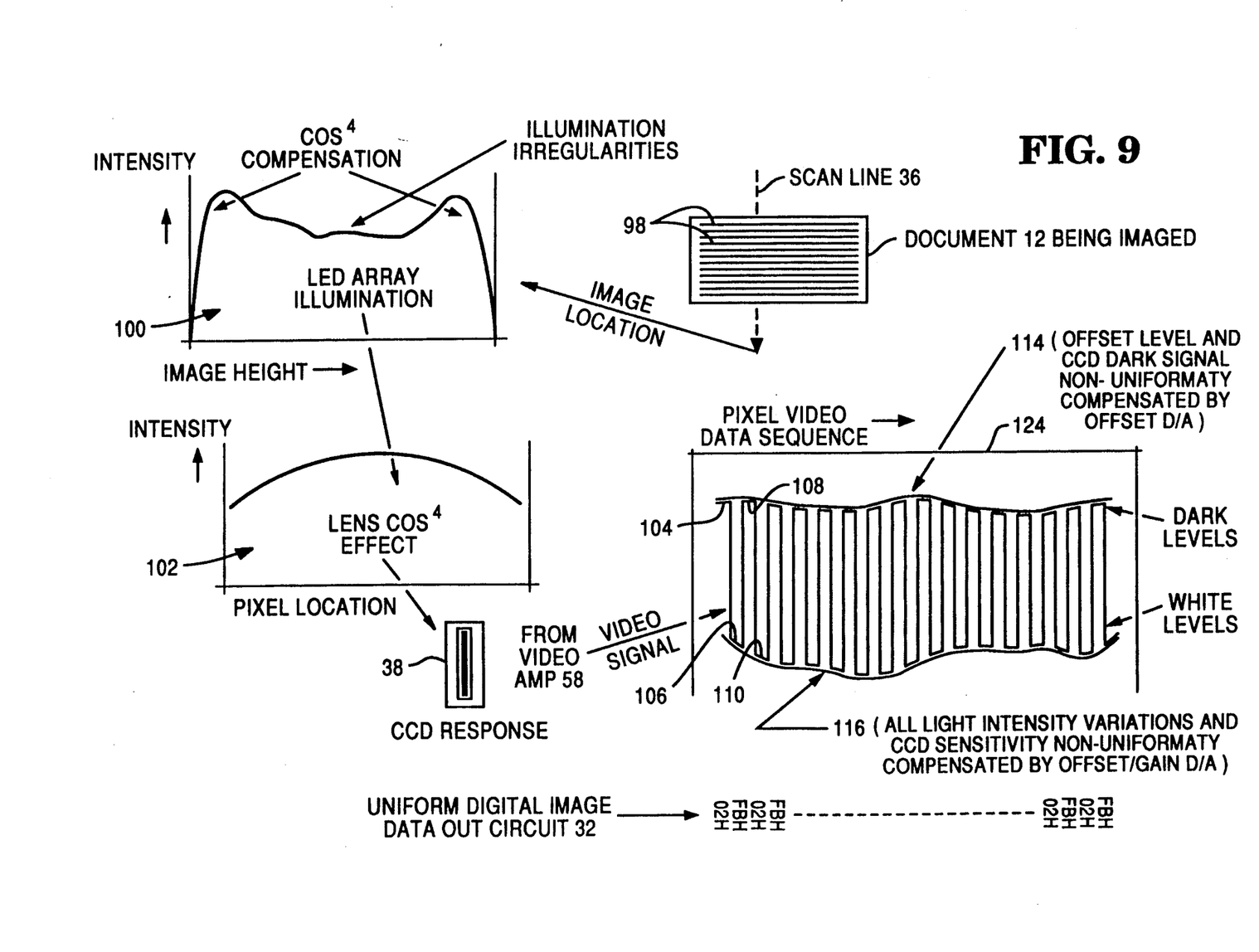
FIG. 9 is a schematic diagram showing certain relationships among different elements associated with the circuit shown in FIG. 3A and 3B.

FIG. 9 shows how the outputs of the individual photodiodes associated with the CCD 38 are affected by uneven light on the scanning line 36 and how they are affected by certain lens effects associated with the lens 48. As an illustration, assume that the document 12 to be imaged has a series of black lines 98 which are separated by white spaces. When the document 36 is scanned in the vertical direction as viewed in FIG. 9, the outputs from the individual photodiodes in the CCD 38 will not of themselves, generally, produce signals or pixels which alternate between completely black and completely white to correspond to the image for the document illustrated therein. Chart 100 in FIG. 9 shows how the intensity of the individual LEDs in the lines 40 and 44 of LEDs (FIG. 2) are varied to help compensate for the fall off in light intensity at the extremities of the scanning line 36 due to lens $cos^4$ effect associated with the lens 48. However, this compensation is not precise and some signal variation must be expected.

Assume that the scanning in FIG. 9 is done from the bottom to the top of the document 12, and that the first black line 98 is encountered. The output from the first black line 98 is shown as segment 104, while the first white output is shown as segment 106. The next black line 98 is recorded as segment 108 followed by the next white space which is recorded as segment 110. This pattern repeats itself as shown.

One of the features of the circuit 32 is that the gain of the flash A/D 60 (FIG. 3A) is adjusted on a pixel by pixel basis so as to take into account the variations discussed relative to FIG. 9. The adjustment is done on a pixel by pixel basis by providing the flash A/D 60 with differential voltages coming from the offset D/A 68 and the offset plus gain D/A 62. As an illustration of the technique, a pixel whose gray scale value lies on point 112 in FIG. 8 lies between the darkest value represented by point 90 and the lightest value represented by point 94 for that particular pixel. In actuality, the point 112 is represented as a ratio between its darkest level and its lightest level when the values represented by the points 90 and 94 are applied as reference voltages to the flash A/D 60.

Continuing with this technique discussed in the previous paragraph, a line 114 (FIG. 9) represents the different values coming out of the offset D/A 68 for the different pixel positions coming from the CCD 38. In other words, line 114 represents the offset level and CCD dark signal non-uniformity compensated by the offset D/A 68. Correspondingly, a line 116 represents different values coming out of the offset plus gain D/A 62. In other words the CCD 38 variations at the white end of the signals therefrom and the variations in the light intensity due to the lines of LEDs 40 and 44 are compensated for by the output from the offset plus gain D/A 62. This compensation is performed so that a uniform output is achieved even though certain elements in the system introduce large variations therein. In other words, if a document 12 contains completely black stripes on a completely white background as discussed relative to FIG. 9, the output of the circuit 32 should produce values corresponding to the actual image on the document 12. This is represented in FIG. 9 by having the output of the circuit 32 alternate between a black pixel 02H (Hex) and a white FBH.

In the embodiment described, the CCD 38 generates 1024 pixels at the scanning line 36, so there would be 1024 values fed to the offset D/A 68 from a static RAM 66 over the bus 74. Correspondingly, there would be 1024 values fed to the offset plus gain D/A 62 from the static RAM 66 over bus 74. There is a pair of values in the static RAM for each of the pixel positions associated with the CCD 38.

The timing of the sequences associated with the processing of data is handled by the camera timing and control circuit 64. The general sequence is as follows. Basically, a pixel is outputted from the CCD 38, and gross offset is removed by the bi-level tracking offset 56 as previously described. The video amplifier 58 then produces an output. At the time that the output from the video amplifier 58 is being generated, the appropriate value for the associated pixel location is supplied or read from the static RAM and transferred or inserted in the offset D/A 68, and the appropriate value for the associated pixel location is supplied or read from the static RAM 66 and transferred or inserted in the offset plus gain D/A 62 and allowed to stabilize. After stabilization, the value in the D/A 68 and the value in the offset plus gain D/A 62 for that pixel location are fed into the flash A/D along with the output from the video amplifier 58 for the same pixel location. The value coming out of the flash A/D is therefore uniquely compensated for with respect to offset and gain as previously discussed. The process is then repeated for the remaining pixels in the scanning line 36 and for the remaining scan lines of pixels. Again, it should be noted that the compensation mentioned is done on a pixel by pixel basis.

A point to be made at this time is that the portion of the circuit 32 which is located to the left of the dashed line 122 (FIGS. 3A and 3B) is associated with the first imager 18-1, for example, and this same portion is repeated for the second imager 18-2. The portion of the circuit 32 which is located to the right of the dashed line 122 is used to operate each of the first and second imagers 18-1 and 18-2. This means that this configuration of design will allow only one imager 18-1 or 18-2 to be operated at a time, due to memory constraints on the machine 10. The static RAM 66 contains the values for the particular imager 18-1 or 18-2 being used, and when the machine switches to the other imager, the values associated with that imager are then stored in the static RAM 66. The control processor 57 stores the data for the imagers 18-1 or 18-2 when that particular imager is not in use. However, duplication of the static RAM 66, latch 70, and the VRAM 78 would allow the two imagers 18-1 and 18-2 to run simultaneously.

How data gets into the static RAM 66 (FIG. 3B) is part of a calibration process associated with this invention. The calibration process is controlled by the control processor 57 shown in FIG. 3B. The coordination of measurements, illumination control, sequencing, and arithmetic image data processing to determine the offset and gain parameters associated with the offset D/A 68 and the offset plus gain D/A 62 are performed by operating software 57-1 associated with the control processor 57. One of the first steps in the calibration process is to start out with a working range set in the +2 V to 0 range. This means that a +2 V is set on the positive side (towards the offset D/A 68) of the flash A/D 60 and 0 V is set on the negative side thereof. With the lines 40 and 44 of LEDs turned off, the output from the CCD 38 is determined, and if the output is between the 4.9 V and 4.8 V shown in FIG. 10, Range #2 is used which is between these two voltages mentioned. If the output from the CCD 38 is between the 5.0 V and the 4.9 V shown, Range #1 is selected by the control processor 57 and used.

After the bi-level tracking offset 56 has been set, the values from a full scan line of pixels are set at two volts, and this is shown by line 124 in FIG. 9. With 2 volts being entered on the top or (+) side of the flash A/D 60 and 0 volts being entered on the bottom or (-) side thereof (as viewed in FIG. 9), several scan lines of pixel data (with the lines 40 and 44 of LEDs being turned off) are averaged for each pixel position at the scanning line. The average value for each pixel position is then placed in the static RAM 66 for use in the offset D/A 68 as previously discussed; these values would have the profile shown by line 114 in FIG. 9. In the embodiment described, the offset D/A 68 has a functional operating range of +2 V to −1 V and is used to remove offset voltages which can be different for each pixel in a scanning line of pixels. The offset plus gain D/A 62 has a functional operating range of +1 V to −2 V and is used to adjust the gain of the flash A/D 60 which can be different for each pixel in a scanning line of pixels.

Continuing with the calibration process, this is how a color balancing and intensity adjustment is made. The light which illuminates the scanning line 36 should be such as to not go outside the range of the video amplifier 58. The line 44 of red LEDs has an output which is considerably greater than the output of the line 40 of green LEDs. Another factor to consider is that it is desirable to have the line 44 of red LEDs and the line 40 of green LEDs each contribute 50% to the total illumination at the scanning line 36 to arrive at a maximum working signal of 100 millivolts as discussed earlier herein. The outputs of the lines 40 and 44 of LEDs are controlled by a pulse width modulator (P.W.M.) 126 (FIG. 3A) synchronized to the CCD 38 integration time under the control of the control processor 57 which independently varies the "on" duty cycle so as to obtain the desired output.

The illumination at the scanning line 36 is controlled as follows. The offset and gain D/A values (for D/A 62) are set in the static RAM 66 (FIG. 3B) to be 2 volts below each of the offset D/A values (for D/A 68), thus setting the minimum gain on the flash A/D 60 that has been compensated for all offsets. With no document at the scanning line 36 (FIG. 2) and with the CCD 38 looking at the white reference member 30, for example, the line 40 of green LEDs is turned on full power or 100%; generally, this will produce a compensated signal of about 50 millivolts; this is about half of the expected 100 millivolt signal in the embodiment described. If the average compensated signal for green alone is more than 50 millivolts, the pulse width modulator (P.W.M.) 126 (FIG. 3A) is adjusted to a level which will produce an average of 50 millivolts. If the average compensated signal for green alone is less than 50 millivolts, then the P.W.M. 126 is left at 100%. The line 44 of red LEDs is then turned on, and their average output is adjusted so that it is equal to the level of the line 40 of green LEDs. It is desirable to have the red and green brightness be equal and to have the overall illumination be as bright as possible up to the combined maximum of 100 millivolts. After the color balancing and intensity adjustment is made as described, the gain correction for the circuit 32 is made.

For the gain correction, the lines 40 and 44 of LEDs are turned on after being adjusted as described. The offset plus gain D/A 62 is set to −2 V below each offset pixel for all pixels in the scanning line 36; this is the setting for minimum gain as described above in adjusting the line of red LEDs. A scan line of 1024 pixels, in the embodiment described, is recorded, and the profile of these pixels follows line 116 in FIG. 9. The offset and gain data in the static RAM 66 (FIG. 3B) is then set to equal the voltage profile described by line 116 (FIG. 9). Thus, the gain of the flash A/D 60 is adjusted for each pixel such that a uniform white document 12 placed in the track 14 will generate equal values out of the flash A/D 60. This is a feature of this invention. This gain correction is done every six minutes while the machine 10 is in operation. There is more change, generally, during the first half hour of operation of the machine 10 when it is warming up; thereafter, the change is less.

One of the problems with the white reference member, like 30 shown in FIG. 2, is that it does not sit in the same plane as does a document 12 when that document is positioned between both imagers 18-1 and 18-2 as shown in FIG. 2. Generally, the illumination which falls on the white reference member 30 is less than that which falls on the document 12 although it does not necessarily have to be that way. A misdirected LED, for example, may direct more light on the member 30 than it does on the scanning line 36. Because of the physical set up of the various components like lines 40 and 44 of LEDs and the physical locations of the reference members 28 and 30, for example, each machine 10 will have its own lighting attributes which are compensated for by a white reference compensation curve which is used as a multiplier for each pixel location. This is unique to the machine 10 and does not usually change unless some of the physical elements of the machine change. It is learned whenever a camera or CCD 38 is installed in a machine 10 during the manufacture thereof or if the CCD 38 is replaced as part of servicing. The learning process is to measure the white level profile line 116 for the white reference, like 30, and a white document 12 within the document track 14. The white reference curve is derived from the ratio of the two sets of measurements and is equal to the ratio of:

$$\frac{\text{white document}}{\text{white reference}}$$

Instead of having 1024 data points as compensation values for each of the pixel positions associated with the scanning line 36, it was discovered that 17 points distributed along the length of the scanning line 36 and using linear interpolation for the intermediate pixels would be adequate for this compensation. The data associated with the white reference curve is stored in non-volatile memory associated with the control processor 57.

What is claimed is:

1. An apparatus comprising:
   a document track;
   first and second images positioned on opposed sides of said document track;
   transport means for moving said document bidirectionally within said document track in operative relationship with said first and second imagers;
   control means for controlling the operation of said apparatus;
   said control means including storing means for storing data, operating software in said storing means, first offset and gain compensation data associated with said first imager stored in said storing means, second offset and gain compensation data associated with said second imager stored in said storing means, a static RAM, and a processor for executing said operating software;
   said first and second imagers each having:
   illumination means for illuminating an associated side of said document along a scan line;
   a CCD; and
   an optical system for directing reflected light from said scan line to said CCD to generate image data at a predetermined rate about the associated side of said document for a predetermined number of pixel positions in said scan line;
   video amplifier means for amplifying said image data and for providing an output at said predetermined rate;
   a flash A/D converter receiving the output from said video amplifier means, and also having a V+ reference input and a V− reference input;
   a first D/A circuit having an input and an output, with said input thereof coupled to said static RAM and with said output thereof coupled to said V+ reference input; and
   a second D/A circuit having an input and an output, with said input thereof coupled to said static RAM and said output thereof coupled to said V-reference input;
   said control means being effective to transfer said first offset and gain compensation data to said static RAM when said first imager is operative, and to transfer said second offset and gain compensation data to said static RAM when said first imager is operative;
   said control means also including timing means to transfer said first offset and gain data to said first and second D/A circuits of said first imager when said first imager is operative to provide offset and gain compensation data for each said pixel position in the associated scan line to enable offset and gain compensation to be performed by the associated flash A/D converter for each pixel position in the associated scan line; and
   said timing means also being effective to transfer said second offset and gain data to said first and second D/A circuits of said second imager when said second imager is operative to provide offset and gain compensation data for each said pixel position in the associated scan line to enable offset and gain compensation to be performed by the associated flash A/D converter for each pixel position in the associated scan line.

2. The apparatus as claimed in claim 1 in which said video amplifier means for each of said first and second imagers includes a bi-level tracking offset circuit.

3. The apparatus as claimed in claim 1 in which said illumination means for each of said first and second imagers generates a predetermined output on the associated side of said document at the associated scan line and comprises:
   a line of green LEDs having outputs directed at the associated scan line to provide half of said predetermined output;
   a line of red LEDs having outputs directed at the associated scan line to provide half of said predetermined output; and
   a pulse width modulator for controlling the outputs of said lines of green and red LEDs.

* * * * *

UNITED STATES PATENT AND TRADEMARK OFFICE
CERTIFICATE OF CORRECTION

PATENT NO. : 5,291,307
DATED : March 1, 1994
INVENTOR(S) : Graham Luckhurst

It is certified that error appears in the above-indentified patent and that said Letters Patent is hereby corrected as shown below:

On the title page:

"[54] "CONTROL CIRCUIT FOR AN IMAGE USED IN A DOCUMENT PROCESSING MACHINE" should be --[54] CONTROL CIRCUIT FOR AN IMAGER USED IN A DOCUMENT PROCESSING MACHINE--

Signed and Sealed this

Seventh Day of February, 1995

*Attest:*

BRUCE LEHMAN

*Attesting Officer*          *Commissioner of Patents and Trademarks*